US012257203B1

(12) United States Patent
Ren

(10) Patent No.: US 12,257,203 B1
(45) Date of Patent: Mar. 25, 2025

(54) SEXUAL STIMULATION DEVICE

(71) Applicant: Xiangjue Ren, Shenzhen (CN)

(72) Inventor: Xiangjue Ren, Shenzhen (CN)

( * ) Notice: Subject to any disclaimer, the term of this patent is extended or adjusted under 35 U.S.C. 154(b) by 0 days.

(21) Appl. No.: 18/807,135

(22) Filed: Aug. 16, 2024

(51) Int. Cl.
*A61H 19/00* (2006.01)

(52) U.S. Cl.
CPC ............. *A61H 19/44* (2013.01); *A61H 19/32* (2013.01); *A61H 19/50* (2013.01)

(58) Field of Classification Search
CPC ......... A61H 19/44; A61H 19/34; A61H 19/32
See application file for complete search history.

(56) References Cited

U.S. PATENT DOCUMENTS 11,771,619 B1 * 10/2023 Yan .................... A61H 23/0254 600/38

FOREIGN PATENT DOCUMENTS

| | | | |
|---|---|---|---|
| CN | 101522156 | A | 9/2009 |
| CN | 103517697 | A | 1/2014 |
| CN | 104284648 | A | 1/2015 |

* cited by examiner

*Primary Examiner* — Scott Luan
(74) *Attorney, Agent, or Firm* — Justin Lampel

(57) ABSTRACT

The present disclosure provides a sexual stimulation device. The sexual stimulation device includes a first stimulation part, a connection part, and a second stimulation part that are flexibly disposed in sequence. The first stimulation part and the second stimulation part are bent towards a same direction from two ends of the connection part respectively. An included angle between a first straight line and a second straight line is defined as θ, and 0°<θ<90°. According to the present disclosure, the included angle between the first straight line and the second straight line is 0°<θ<90°, so that the sexual stimulation device can be used in different scenarios.

9 Claims, 5 Drawing Sheets

SEXUAL STIMULATION DEVICE

TECHNICAL FIELD

The present disclosure relates to the field of sexual stimulation devices, and in particular to a sexual stimulation device.

BACKGROUND

With the development of society, family pressures and work pressures gradually increase. To reduce the family pressures and work pressures, decompression toys emerge. A sexual stimulation device has been gradually promoted as a type of decompression toy.

In the field of sexual stimulation devices, the sexual stimulation device usually brings sexual excitement to users, to relieve fatigue. The principle of the sexual stimulation device is usually to stimulate genital areas or sensitive areas of the users, to generate stimulation. Different genders of users who have different sexual preferences have different sensitive areas. An existing sexual stimulation device is generally designed for a specific stimulation area, which cannot be adjusted according to different needs of the users. Alternatively, a shape of an existing sexual stimulation device made of silicone is changed by external deformation for the use of different stimulation areas. In this case, the sexual stimulation device cannot be remained in an original shape due to the elasticity of the silicone. In addition, the original shape of the sexual stimulation device cannot meet stimulated needs of the different sensitive areas. Therefore, when the user needs to change a different area for sexual stimulation, the single sexual stimulation device cannot meet the needs of the user. As a result, the existing sexual stimulation device has poor applicability.

SUMMARY

In view of this, it is necessary to provide a sexual stimulation device that can simultaneously meet the stimulated needs of different sensitive areas of users, to resolve the above problems.

A sexual stimulation device provided in the embodiments of the present disclosure includes a first stimulation part, a connection part, and a second stimulation part that are flexibly disposed in sequence, where the first stimulation part and the second stimulation part are bent towards a same direction from two ends of the connection part respectively;

the connection part includes a bending point located at a center of the connection part, the first stimulation part includes a first surface facing the second stimulation part, and the second stimulation part includes a second surface facing the first stimulation part; and a straight line from any point on the first surface to the bending point is defined as a first straight line, a straight line from any point on the second surface to the bending point is defined as a second straight line, an included angle between the first straight line and the second straight line is defined as θ, and 0°<θ<90°.

In at least one embodiment of the present disclosure, the first stimulation part includes a first stimulation source and a second stimulation source; and the first stimulation source and the second stimulation source are disposed side by side on the connection part, and configured to separately or simultaneously extend into a reproductive area of a user.

In at least one embodiment of the present disclosure, the connection part includes an arc surface connected to the first stimulation source and the second stimulation source; and the arc surface is located between the first stimulation source and the second stimulation source, and the arc surface is spliced with a surface of the first stimulation source and a surface of the second stimulation source.

In at least one embodiment of the present disclosure, it is defined that an intersection line of the arc surface and the first stimulation source includes a first point closest to the second stimulation source, and it is defined that an intersection line of the arc surface and the second stimulation source includes a second point closest to the first stimulation source; and a distance from the first point to the second point is defined as L1, and 19 mm<L1<21 mm.

In at least one embodiment of the present disclosure, a direction of a port formed by enclosing the first stimulation part and the second stimulation part is defined as a first direction, and the first stimulation source and the second stimulation source are symmetrically disposed on the connection part along the first direction.

In at least one embodiment of the present disclosure, it is defined that the first stimulation source includes a first curve closest to the second stimulation source, and it is defined that the second stimulation source includes a second curve closest to the first stimulation source; and a furthest distance from the first curve to the second curve is defined as L2, and 18 mm<L2<22 mm.

In at least one embodiment of the present disclosure, a placement port is formed by enclosing the first stimulation source and the second stimulation source, and the placement port is directly opposite to the second stimulation part.

In at least one embodiment of the present disclosure, the sexual stimulation device further includes a silicone sleeve, where the silicone sleeve wraps the first stimulation part and the second stimulation part.

In at least one embodiment of the present disclosure, the sexual stimulation device further includes a control assembly; and the control assembly is disposed in the silicone sleeve and electrically connected to the first stimulation part and the second stimulation part.

In at least one embodiment of the present disclosure, the sexual stimulation device further includes a button; and the button partially extends into the silicone sleeve and is electrically connected to the control assembly, and partially extends outside the silicone sleeve for a user to operate.

According to the sexual stimulation device, the first stimulation part and the second stimulation part are bent towards the same direction from the two ends of the connection part, and the included angle between the first straight line and the second straight line is set to 0°<θ<90°. Therefore, when the sexual stimulation device is used on a female, the first stimulation part and the second stimulation part may be simultaneously inserted into a vagina and an anus of the female. When the sexual stimulation device is used on a female and a male at the same time and the first stimulation part is erected on a penis of the male, the second stimulation part may be directly opposite to a clitoris of the female at the included angle, to stimulate both the male and the female at the same time during a sexual intercourse.

REFERENCE NUMERALS

Figure 1:
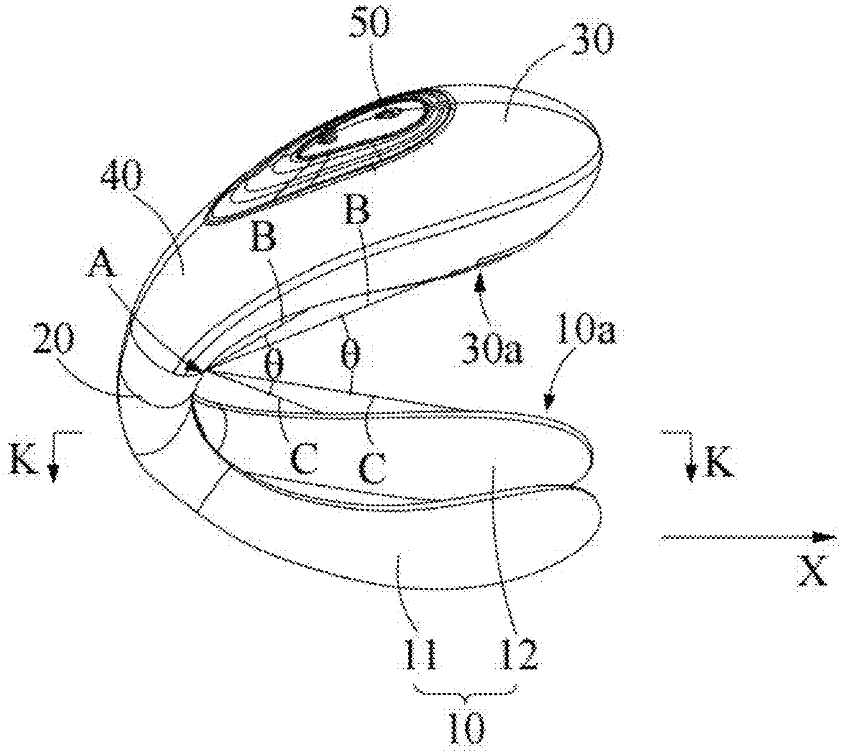
FIG. 1 is a schematic diagram of a three-dimensional structure of a sexual stimulation device according to an embodiment of the present disclosure.
Figure 2:
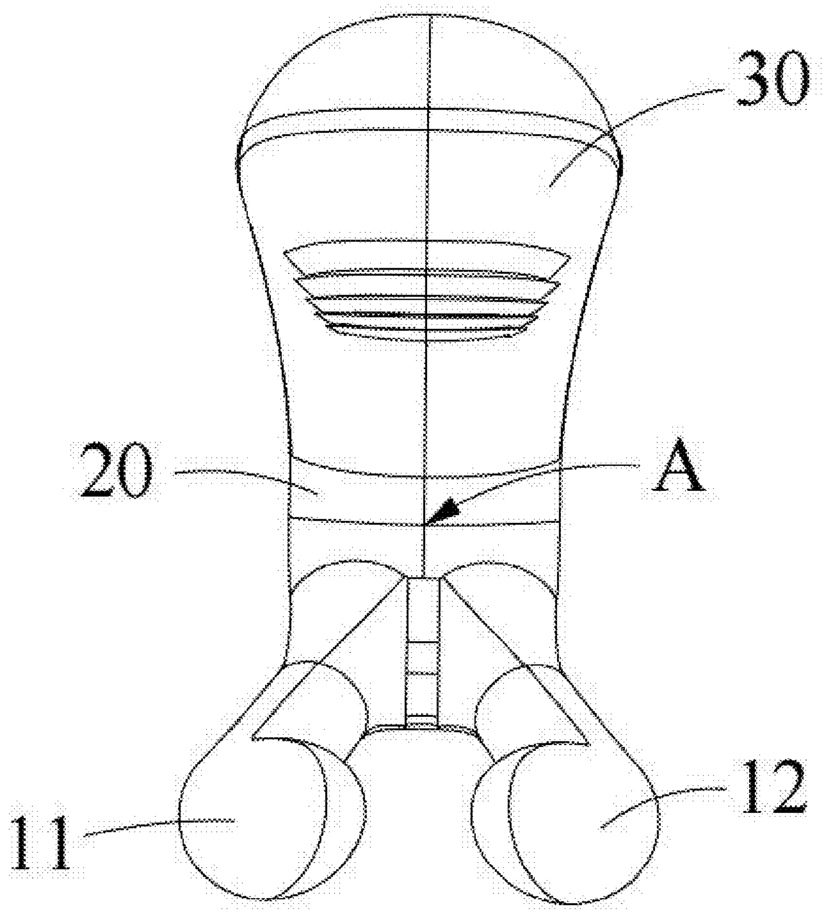
FIG. 2 is a side view of the sexual stimulation device in FIG. 1.

100: sexual stimulation device; 10: first stimulation part; 10*a*: first surface; 11: first stimulation source; 12: second stimulation source; 10*b*: placement port; 20: connection part; 21: arc surface; D: first point; E: second point; 30: second stimulation part; 30*a*: second surface; 40: silicone sleeve; 50: button; A: bending point; B: first straight line; C: second straight line; X: first direction; S1: first curve; S2: second curve; M1: anus; M2: vagina; M3: penis.

DETAILED DESCRIPTION OF THE EMBODIMENTS

The technical solutions in the embodiments of the present disclosure are described below with reference to the accompanying drawings in the embodiments of the present disclosure. It is apparent that the described embodiments are merely some rather than all of the embodiments of the present disclosure.

It should be noted that when a component is "connected" to another component, the component may be connected to the another component directly, or indirectly via an intermediate component. When a component is "arranged on" another component, the component may be directly arranged on the another component or there may be an intermediate component. The terms "top", "bottom", "upper", "lower", "left", "right", "front", "rear", and similar expressions used in this specification are used for illustrative purposes only.

A sexual stimulation device provided in the embodiments of the present disclosure includes a first stimulation part, a connection part, and a second stimulation part that are flexibly disposed in sequence. The first stimulation part and the second stimulation part are bent towards a same direction from two ends of the connection part respectively.

The connection part includes a bending point located at a center of the connection part, the first stimulation part includes a first surface facing the second stimulation part, and the second stimulation part includes a second surface facing the first stimulation part.

A straight line from any point on the first surface to the bending point is defined as a first straight line, a straight line from any point on the second surface to the bending point is defined as a second straight line, an included angle between the first straight line and the second straight line is defined as θ, and 0°<θ<90°.

According to the sexual stimulation device, the first stimulation part and the second stimulation part are bent towards the same direction from the two ends of the connection part, and the included angle between the first straight line and the second straight line is set to 0°<θ<90°. Therefore, when the sexual stimulation device is used on a female, the first stimulation part and the second stimulation part may be simultaneously inserted into a vagina and an anus of the female. When the sexual stimulation device is used on a female and a male at the same time and the first stimulation part is erected on a penis of the male, the second stimulation part may be directly opposite to a clitoris of the female at the included angle, to stimulate both the male and the female at the same time during a sexual intercourse.

Some embodiments of the present disclosure are described in detail below with reference to the accompanying drawings. If no conflict occurs, the following embodiments and features of the embodiments may be combined with each other.

Referring to FIG. 1 to FIG. 5, an embodiment provides a sexual stimulation device 100. The sexual stimulation device 100 includes a first stimulation part 10, a connection part 20, and a second stimulation part 30 that are flexibly disposed in sequence. The first stimulation part 10 and the second stimulation part 30 are bent towards a same direction from two ends of the connection part 20 respectively.

The connection part 20 includes a bending point A located at a center of the connection part, the first stimulation part 10 includes a first surface 10*a* facing the second stimulation part 30, and the second stimulation part 30 includes a second surface 30*a* facing the first stimulation part 10.

A straight line from any point on the first surface 10*a* to the bending point A is defined as a first straight line B, a straight line from any point on the second surface 30*a* to the bending point A is defined as a second straight line C, an included angle between the first straight line B and the second straight line C is defined as θ, and 0°<θ<90°. It should be understood that, in the above solution, the included angle θ is set between 0° and 90°, to enable the sexual stimulation device to be converted between a straight line or an arbitrary bending angle, thereby being used in different scenarios.

Preferably, in a specific embodiment, the included angle θ between the first straight line B and the second straight line C may be 30°<θ<60° as follows:

It should be noted that the sexual stimulation device is applicable to different sexual stimulation by setting the included angle between the first straight line B and the second straight line C during use.

Figure 4:
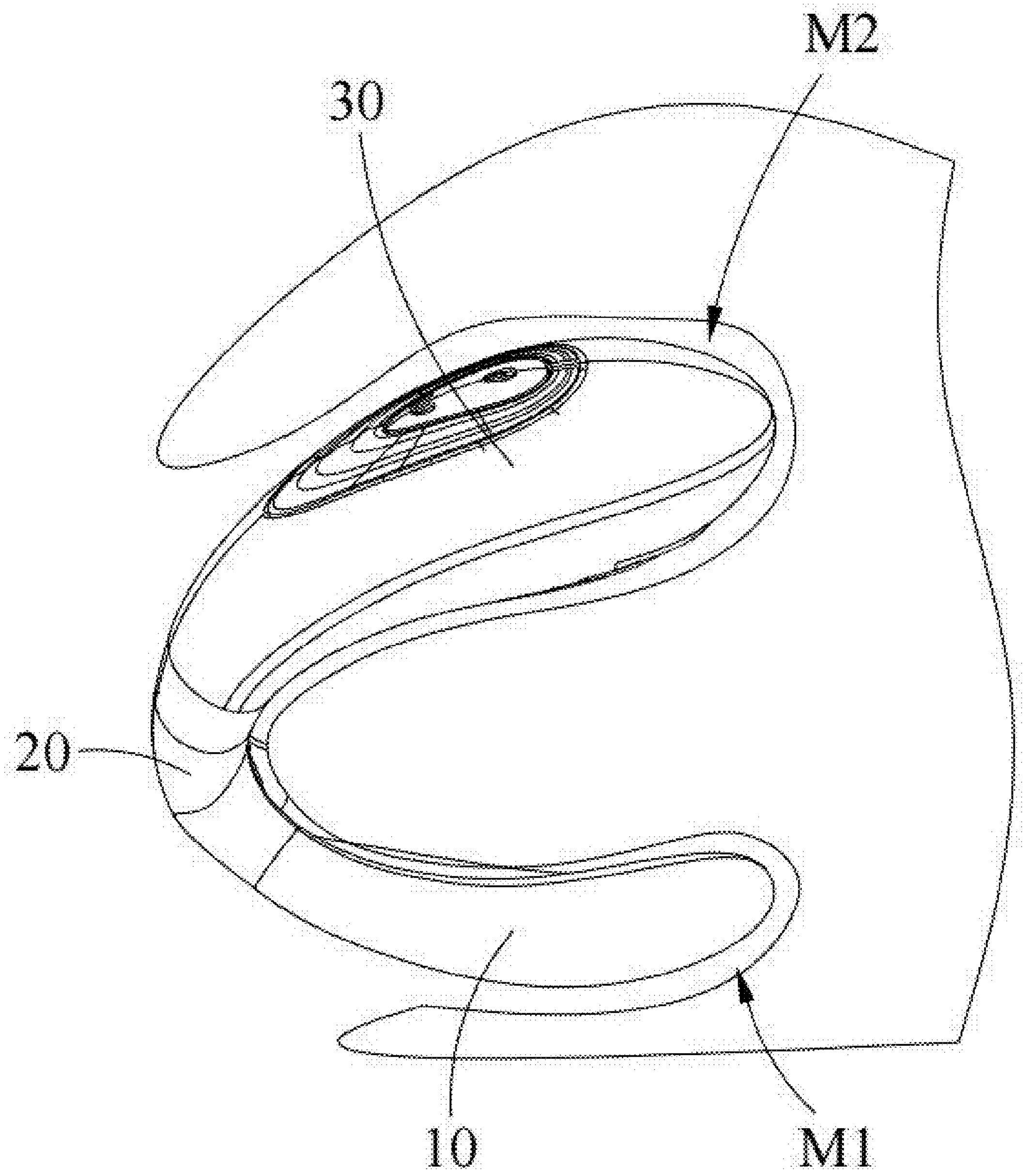
FIG. 4 is a schematic diagram of the sexual stimulation device when being inserted into an anus and a vagina of a female in FIG. 1.

Specifically, as shown in FIG. 4, in a first scenario, when a female sits on back, the first stimulation part 10 of the sexual stimulation device is inserted into an anus M1 and the second stimulation part 30 of the sexual stimulation device is inserted into a vagina M2, the first stimulation part 10 and the second stimulation part 30 are started to stimulate the anus M1 and the vagina M2 at the same time. In this case, the female is in a comfortable posture and can control insertion depths of the first stimulation part 10 and the second stimulation part 30.

In a second scenario, a female feels soreness of each part of the body while lying on stomach for a long time. Therefore, when lying on stomach, the female needs to keep changing a lying posture and angle, to reduce the soreness. In addition, when the female lies on stomach, the vagina M2 and the anus M1 open, the sexual stimulation device may be inserted deeper to obtain deeper pleasure from stimulation. In this case, the sexual stimulation device needs to have a greater opening or closing angle, to meet needs of an insertion depth. At present, many sexual stimulation devices on the market are made of silicone. When the female lies on the ground and the sexual stimulation device is inserted deeper, because of elasticity of the silicone, the silicone squeezes muscles between the vagina M2 and the anus M1 of the female, resulting in muscle soreness.

Figure 5:
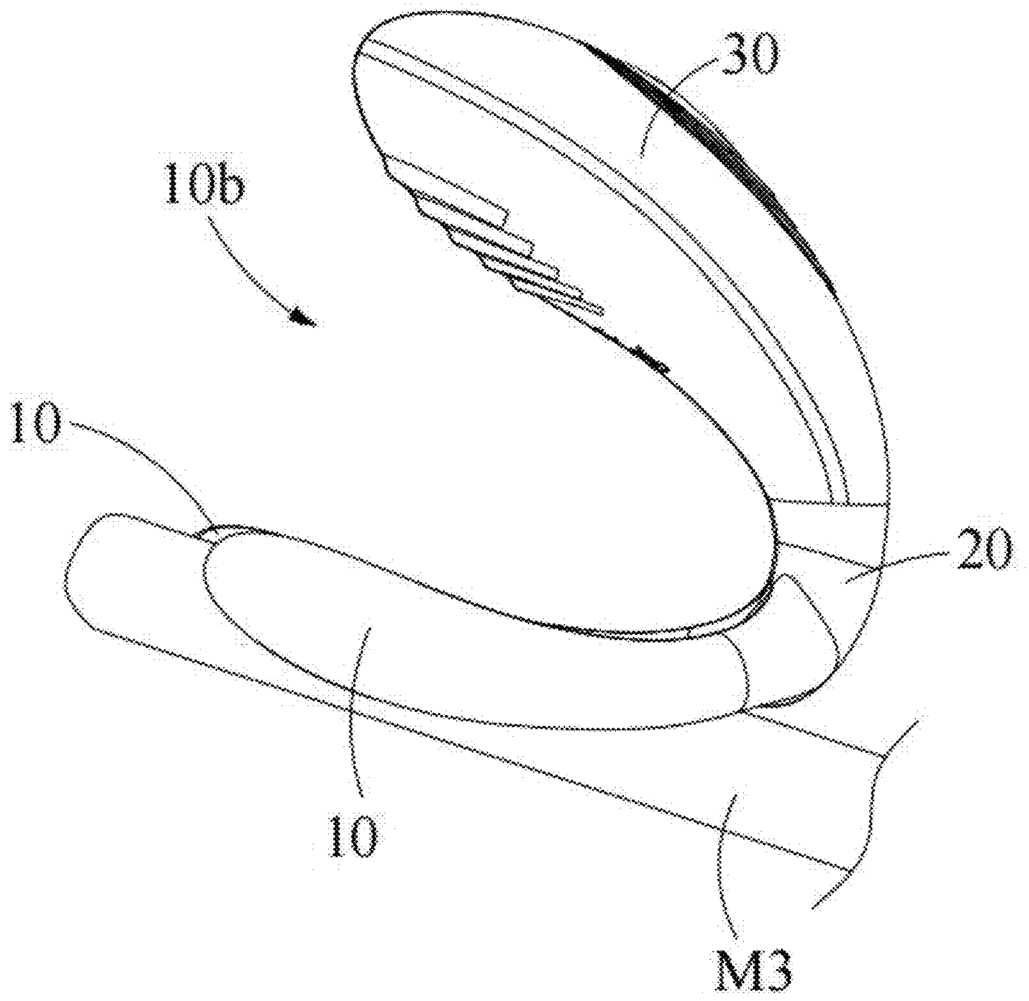
FIG. 5 is a schematic diagram of the sexual stimulation device when being used by a male in FIG. 1.

Specifically, as shown in FIG. 5, in a third scenario, during a sexual intercourse between a male and a female, the first stimulation part 10 of the sexual stimulation device of the present disclosure may be erected to a penis M3 of the male. Preferably, the first stimulation part 10 may be erected to the penis M3 of the male via a condom. During insertion and pulling out, the male drives the second stimulation part 30 of the sexual stimulation device to bump the clitoris of the female, to create pleasure at the same time. In this case, because the penis M3 of the male is long, when the sexual stimulation device is sleeved on the penis M3 of the male, it ensures that the second stimulation part 30 is lifted to a specified height, and ensures that the second stimulation part 30 does not extend outside the penis M3 excessively. This resolves a problem that the sexual stimulation device falls off due to instability of the sexual stimulation device during bumping. Therefore, a relative angle between the first stimulation part 10 and the second stimulation part 30 needs to be adjusted. Specific angles are as follows:

When the female sits on back, due to a reproductive structure of the female and a shape and size of the sexual stimulation device, the sexual stimulation device may not be inserted deeply. In this case, heads of the first stimulation part 10 and the second stimulation part 30 are respectively inserted into the anus M1 and the vagina M2 of the female. It may be learned from numerous studies that the best stimulation pleasure can be achieved when angles θ between two relatively nearest points of the first stimulation part 10 and the second stimulation part 30 each and the bending point A are 30°.

When the female lies on the ground, because the female needs to keep changing positions, and the first stimulation part 10 and the second stimulation part 30 are deeply inserted into the anus M1 and the vagina M2 respectively. It may be learned from numerous studies that angles θ between two relatively farthest points of the first stimulation part 10 and the second stimulation part 30 each and the bending point A are 60°. To meet the needs of different depths, when the first stimulation part 10 and the second stimulation part 30 extend outwardly from the connection part 20, a magnitude of an included angle θ between lines connecting any two points each to the bending point A gradually decreases. Therefore, the included angle θ between the first straight line B and the second straight line C is $30° < θ < 60°$.

In a specific embodiment, a size of the first stimulation part 10 is smaller than a size of the second stimulation part 30. The second stimulation part 30 is inserted into an organ above regardless of whether the female sits on back or lies on stomach. Therefore, when a first stimulation source 11 and a second stimulation source 12 are simultaneously started, the second stimulation part 30 is always located on an upper side. This prevents the second stimulation part 30 from falling off because of gravity or a vibratory force when the first stimulation source 11 and the second stimulation source 12 are started. In a specific embodiment, vibration motors are disposed in the first stimulation part 10 and the second stimulation part 30, but are not limited thereto apparently. For example, in other embodiments, the first stimulation part 10 and the second stimulation part 30 may be heating components or other structures capable of generating stimulation.

In a specific embodiment, the first stimulation part 10 includes a first stimulation source 11 and a second stimulation source 12.

The first stimulation source 11 and the second stimulation source 12 are disposed side by side on the connection part 20, and configured to separately or simultaneously extend into a reproductive area of a user.

It should be noted that, because users are not fixed, and sizes of anuses M1 and the vaginae M2 of different persons are different, in the present disclosure, the first stimulation part 10 is disposed as the first stimulation source 11 and the second stimulation source 12 that are disposed side by side. Therefore, when an anus M1 or a vagina M2 of a user is large, the first stimulation source 11 and the second stimulation source 12 are inserted in the anus M1 or the vagina M2 of the user. When an anus M1 or a vagina M2 of a user is small, the first stimulation source 11 or the second stimulation source 12 is separately inserted in the anus M1 of the user, to increase applicability.

Further, in another scenario, the first stimulation source 11 and the second stimulation source 12 are separately disposed in the present disclosure. Alternatively, the first stimulation source 11 and the second stimulation source 12 may be clamped on breasts of the female. The first stimulation source 11 is directly in contact with a nipple of the female, to stimulate the breast of the female.

In a specific embodiment, the vibration motors are disposed in the first stimulation source 11 and the second stimulation source 12.

Figure 3:
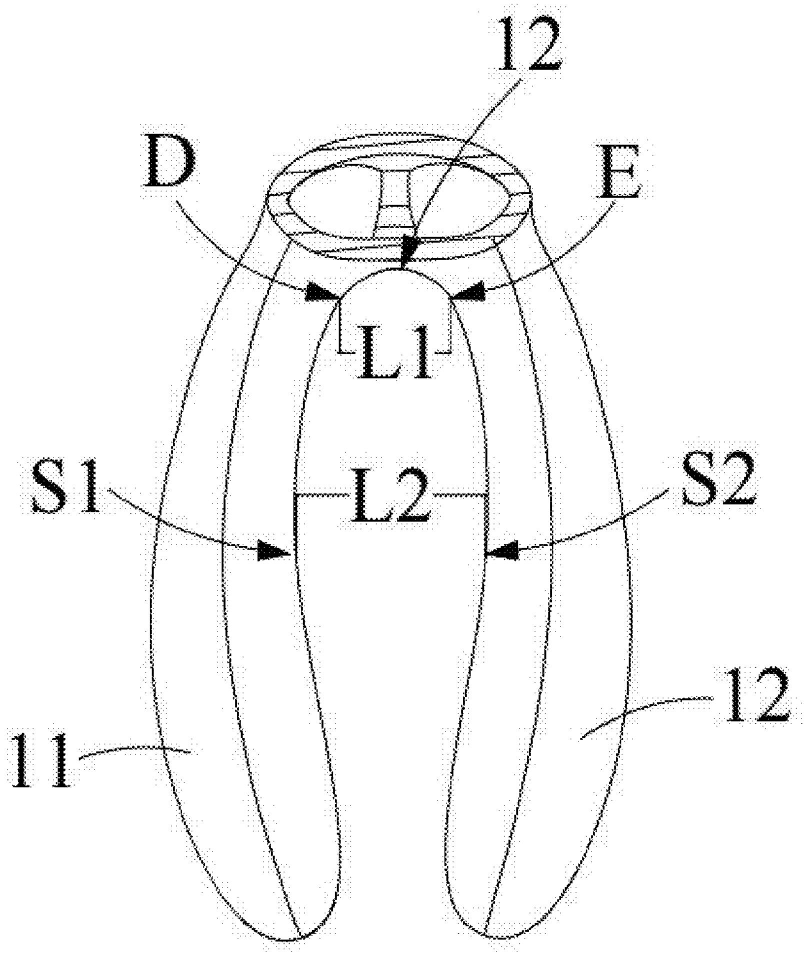
FIG. 3 is a sectional view of the sexual stimulation device along a direction K-K in FIG. 1.

Specifically, referring to FIG. 3 and FIG. 5, in a specific embodiment, the connection part 20 includes an arc surface 21 connected to the first stimulation source 11 and the second stimulation source 12.

The arc surface 21 is located between the first stimulation source 11 and the second stimulation source 12, and the arc surface 21 is spliced with a surface of the first stimulation source 11 and a surface of the second stimulation source 12.

It should be noted that, when a male uses the sexual stimulation device, to increase comfort of the first stimulation source 11 and the second stimulation source 12 while being placed on a penis M3 of the male, the arc surface 21 is disposed between the first stimulation source 11 and the second stimulation source 12 for transition, to avoid scratches to the penis M3 of the male caused by a right angle or another angle between the first stimulation source 11 and the second stimulation source 12.

Specifically, referring to FIG. 3, in a specific embodiment, it is defined that an intersection line of the arc surface 21 and the first stimulation source 11 includes a first point D closest to the second stimulation source 12, and it is defined that an intersection line of the arc surface 21 and the second stimulation source 12 includes a second point E closest to the first stimulation source 11.

A distance from the first point D to the second point E is defined as L1, and 19 mm<L1<21 mm.

It should be noted that, it may be learned from the market research that a cross-section of a root of a penis M3 of a male is approximately elliptical, with a long axis of approximately 40 mm and a short axis of approximately 38 mm. When the first stimulation source 11 and the second stimulation source 12 are erected on the penis M3, generally erected at the root of the penis M3, in order to prevent the first stimulation source 11 and the second stimulation source 12 from falling off because of a long distance, and prevent the first stimulation source 11 and the second stimulation source 12 from failing to stimulate the penis M3 of the male because of a short distance, the distance between the first point D and the second point E is set to 19 mm<L1<21 mm, to simultaneously prevent the first stimulation source 11 and the second stimulation source 12 from falling off or failing, thereby achieving stimulation effect. Preferably, the distance L1 between the first point D to the second point E is 20 mm. Specifically, it may be learned from the research that the long axis of the cross-section of the penis M3 of the male is about 40 mm. When the distance L1 between the first point D and the second point E is 20 mm, the first stimulation source 11 and the second stimulation source 12 are symmetrically disposed relative to a center line of the penis M3 as a symmetric line. For zones on left and right sides of the center line, the first stimulation part 10 and the second stimulation part 30 are located at centers. In this case, the penis M3 has largest support areas for the first stimulation source 11 and the second stimulation source 12, and the first stimulation source 11 and the second stimulation source 12 may stimulate the penis M3 in the areas on the left and right sides of the center line respectively. Therefore, when the distance L1 between the first stimulation source 11 and the second stimulation source 12 is $19\ \mathrm{mm} < L1 < 21\ \mathrm{mm}$, both the first stimulation source 11 and the second stimulation source 12 are not the least easy to fall off the penis M3, and may achieve stimulation effect.

In a specific embodiment, a direction of a port formed by enclosing the first stimulation part 10 and the second stimulation part 30 is defined as a first direction X, and the first stimulation source 11 and the second stimulation source 12 are symmetrically disposed on the connection part 20 along the first direction X.

It should be noted that when the first stimulation source 11 and the second stimulation source 12 are erected to the penis M3 of the male, the penis M3 of the male is erected along the first direction X. In this case, extension directions of the first stimulation source 11 and the second stimulation source 12 are consistent with the erection direction of the penis M3 of the male. Therefore, more parts of the first stimulation source 11 and the second stimulation source 12 may be erected to the penis M3 of the male, to better prevent the first stimulation source 11 and the second stimulation source 12 from falling off during operation.

Further, it is defined that the first stimulation source 11 includes a first curve S1 closest to the second stimulation source 12, and it is defined that the second stimulation source 12 includes a second curve S2 closest to the first stimulation source 11.

A furthest distance from the first curve S1 to the second curve S2 is defined as L2, and $18\ \mathrm{mm} < L2 < 22\ \mathrm{mm}$.

It should be noted that, it can be learned from the above description that the furthest distance L2 from the first curve S1 to the second curve S2 is greater than the distance L1 between the first point D and the second point E. Therefore, it may be understood that the port between the first stimulation source 11 and the second stimulation source 12 is the widest at a distance of L2, or the first stimulation source 11 and the second stimulation source 12 open outwardly the furthest at L2. In this case, relative to the first point D and the second point E, the first stimulation source 11 and the second stimulation source 12 are erected at a marginal zone of the penis M3. It may be learned from the above manner that the first stimulation source 11 and the second stimulation source 12 extend from the root of the penis M3 to two sides, to erect on a scapus of the penis M3. When the penis M3 vibrates or moves horizontally, the first stimulation source 11 and the second stimulation source 12 located at the scapus of the penis M3 can withstand left and right vibratory forces and keep stable, thereby better preventing the first stimulation source 11 and the second stimulation source 12 from falling off.

Specifically, a placement port 10*b* is formed by enclosing the first stimulation source 11 and the second stimulation source 12, and the placement port 10*b* is directly opposite to the second stimulation part 30.

It may be understood that the placement port 10*b* is formed between the first stimulation source 11 and the second stimulation source 12, to facilitate erection on the scapus of the penis M3. Specifically, a shape of the placement port 10*b* is as described above, and will not be described herein.

Further, the second stimulation source 12 may be directly opposite to the placement port 10*b*, to enable the second stimulation part 30 to be directly opposite to the clitoris of a female when a male wears the first stimulation source 11 and the second stimulation source 12 on the penis M3 for a sexual intercourse.

In a specific embodiment, the sexual stimulation device further includes a silicone sleeve 40. The silicone sleeve 40 wraps the first stimulation part 10 and the second stimulation part 30.

It should be noted that the silicone sleeve 40 wraps the first stimulation part 10 and the second stimulation part 30, to enable the first stimulation part 10 and the second stimulation part 30 to be in contact with silicone when the first stimulation part 10 and the second stimulation part 30 are inserted in a body, thereby avoiding damage to skin because the first stimulation part 10 and the second stimulation part 30 are directly in contact with the skin.

In a specific embodiment, the sexual stimulation device further includes a control assembly.

The control assembly is disposed in the silicone sleeve 40 and electrically connected to the first stimulation part 10 and the second stimulation part 30.

In the present disclosure, the control assembly is disposed in the silicone sleeve 40 and electrically connected to the first stimulation part 10 and the second stimulation part 30 at the same time. The first stimulation part 10 and the second stimulation part 30 are started or shut down via the control assembly. Preferably, the control assembly is connected in series with both the first stimulation part 10 and the second stimulation part 30, and alternatively, the control assembly may be separately connected in parallel to the first stimulation part 10 and the second stimulation part 30, to provide an operation of simultaneous control or separate control.

Further, the sexual stimulation device further includes a button 50.

The button 50 partially extends into the silicone sleeve 40 and is electrically connected to the control assembly, and the button 50 partially extends outside the silicone sleeve 40 for a user to operate.

It should be noted that in the present disclosure, the button 50 is electrically connected to the control assembly and partially extends outside the silicone sleeve 40 for the user to operate and control opening and closing of the first stimulation part 10 and the second stimulation part 30.

The above described are merely implementations of the present disclosure. It should be noted here that those of ordinary skill in the art may make improvements without departing from the concept of the present disclosure, but such improvements should fall within the protection scope of the present disclosure.

What is claimed is:

1. A sexual stimulation device, comprising a first stimulation part, a connection part, and a second stimulation part that are flexibly disposed in sequence, wherein the first stimulation part and the second stimulation part are bent towards a same direction from two ends of the connection part respectively;

the connection part comprises a bending point located at a center of the connection part, the first stimulation part comprises a first surface facing the second stimulation part, and the second stimulation part comprises a second surface facing the first stimulation part; and a straight line from any point on the first surface to the bending point is defined as a first straight line, a straight line from any point on the second surface to the bending point is defined as a second straight line, an included angle between the first straight line and the second straight line is defined as θ, and $0° < θ < 90°$;

wherein the first stimulation part comprises a first stimulation source and a second stimulation source; and the first stimulation source and the second stimulation source are disposed side by side on the connection part, and configured to separately or simultaneously extend into a reproductive area of a user.

2. The sexual stimulation device according to claim 1, wherein the connection part comprises an arc surface connected to the first stimulation source and the second stimulation source; and the arc surface is located between the first stimulation source and the second stimulation source, and the arc surface is spliced with a surface of the first stimulation source and a surf ace of the second stimulation source.

3. The sexual stimulation device according to claim 2, wherein it is defined that an intersection line of the arc surface and the first stimulation source comprises a first point closest to the second stimulation source, and it is defined that an intersection line of the arc surface and the second stimulation source comprises a second point closest to the first stimulation source; and a distance from the first point to the second point is defined as L1, and 19 mm<L1<21 mm.

4. The sexual stimulation device according to claim 2, wherein a direction of a port formed by enclosing the first stimulation part and the second stimulation part is defined as a first direction, and the first stimulation source and the second stimulation source are symmetrically disposed on the connection part along the first direction.

5. The sexual stimulation device according to claim 2, wherein it is defined that the first stimulation source comprises a first curve closest to the second stimulation source, and it is defined that the second stimulation source comprises a second curve closest to the first stimulation source; and a furthest distance from the first curve to the second curve is defined as L2, and 18 mm<L2<22 mm.

6. The sexual stimulation device according to claim 5, wherein a placement port is formed by enclosing the first stimulation source and the second stimulation source, and the placement port is directly opposite to the second stimulation part.

7. The sexual stimulation device according to claim 1, further comprising a silicone sleeve, wherein the silicone sleeve wraps the first stimulation part and the second stimulation part.

8. The sexual stimulation device according to claim 7, further comprising a control assembly, wherein the control assembly is disposed in the silicone sleeve and electrically connected to the first stimulation part and the second stimulation part.

9. The sexual stimulation device according to claim 8, further comprising a button, wherein the button partially extends into the silicone sleeve and is electrically connected to the control assembly, and partially extends outside the silicone sleeve for a user to operate.

* * * * *